United States Patent [19]
Bowser

[11] Patent Number: 6,125,951
[45] Date of Patent: Oct. 3, 2000

[54] HOLE DRILLING APPARATUS FOR TREE FARMS

[76] Inventor: Lewis H. Bowser, 551 Stauffer Rd., Lititz, Pa. 17543

[21] Appl. No.: 09/260,529

[22] Filed: Feb. 26, 1999

Related U.S. Application Data

[60] Provisional application No. 60/094,589, Jul. 29, 1998.

[51] Int. Cl.[7] .............................. E21B 3/06; A01B 35/00
[52] U.S. Cl. ................................. 175/203; 37/2; 172/40; 172/25; 405/232
[58] Field of Search .................................... 175/203, 202, 175/162, 377; 172/40, 39, 42, 25, 26, 21; 111/100, 109, 99; 37/2; 173/46, 48, 148, 149; 405/232, 242

[56] References Cited

U.S. PATENT DOCUMENTS

| | | | |
|---|---|---|---|
| 1,575,146 | 3/1926 | Brown | 172/40 X |
| 2,728,283 | 12/1955 | Oswalt | 172/40 X |
| 2,849,939 | 9/1958 | Montgomery | 172/42 X |
| 2,905,253 | 9/1959 | Ditter | 172/40 X |
| 3,512,366 | 5/1970 | Turzillo | 405/242 X |
| 3,833,071 | 9/1974 | Koosman et al. | 175/171 X |
| 4,511,004 | 4/1985 | Deneen . | |
| 4,621,697 | 11/1986 | Webb . | |
| 4,815,234 | 3/1989 | Connolly . | |
| 4,901,800 | 2/1990 | Wilson | 172/25 |
| 4,917,196 | 4/1990 | Stiffler et al. | 175/385 |
| 5,507,354 | 4/1996 | Harleman | 175/203 X |

FOREIGN PATENT DOCUMENTS

| | | | |
|---|---|---|---|
| 1548396 | 3/1990 | U.S.S.R. | 175/203 |

*Primary Examiner*—Dennis L. Taylor
*Attorney, Agent, or Firm*—Larry W. Miller

[57] ABSTRACT

A hole drilling apparatus facilitates the task of drilling holes in the ground at predetermined locations for the planting of replacement Christmas tree seedlings. The hole drilling apparatus includes a bifurcated frame having a base frame portion and a working frame portion pivotally mounted on the base frame portion. A spring mechanism operatively engages the working frame portion and the base frame portion to bias the working frame portion into a raised pivoted position. The working frame portion pivotally carries a work plate having an auger mechanism mounted thereon for pivotal movement in a vertical manner with the working frame portion to advance the auger mechanism into the ground during operation to drill a hole. The spring mechanism can be repositioned to release the biasing force exerted thereby and allow the apparatus to be converted into the compact transport position with the working frame portion lowered against the base frame portion to reduce the profile of the apparatus. The spring mechanism can then be used to brake the front tire of the apparatus to prevent the apparatus from rolling around during transport thereof. The performance of the auger mechanism is also improved with the addition of an angled cutting bit detachably mounted on the cutting edge of the auger flighting. The cutting bit is angled downwardly away from the shaft of the auger so that the outside edge of the bit will engage the ground before the edge of the bit next to the auger shaft.

21 Claims, 5 Drawing Sheets

HOLE DRILLING APPARATUS FOR TREE FARMS

CROSS-REFERENCE TO RELATED APPLICATIONS

This application claims domestic priority on U.S. Provisional Patent application Ser. No. 60/094,589, filed Jul. 29, 1998.

BACKGROUND OF THE INVENTION

This invention relates generally to an apparatus for drilling holes for planting trees at a tree farm and, more particularly, to a mobile, portable apparatus for mounting a motorized auger to permit movement within a Christmas tree farm to replace harvested trees while maintaining a grid pattern.

Christmas tree farms consist of fir trees planted on a regular grid pattern, typically on five foot spacings such that each tree is located approximately five feet from each adjacent tree positioned on the orthogonal major axes of the grid pattern. This grid pattern needs to be maintained to facilitate the use of mechanized equipment for maintenance of the grounds, such as mowers and compact tractors. However, once the trees are grown to a harvestable size, the grid pattern spacing does not provide for a large amount of room for maneuvering such mechanized equipment.

For Christmas tree farms operating on the "pick and cut" manner, i.e. customers choose the tree of their choice and have the tree harvested, replacement of the harvested tree becomes difficult due to the remaining unharvested trees that could be immediately adjacent to the stump of the harvested tree. Damage to the yet unharvested tree must be avoided in the re-planting of the seedling to replace the harvested tree. Currently, the generally used method of replacing harvested trees is to drill a hole next to the harvested stump and plant a seedling, so that the five foot spacing of the grid pattern can be maintained to prevent the new seedling from being placed into risk of damage from the maintenance equipment.

Drilling the hole for the replacement seedling typically involves a cutting of the roots of the harvested stump with an implement such as an axe and then using a hand-held motorized auger to drill the hole to the desired depth. The use of the hand-held motorized auger is difficult to control due to the weight of the device and the engagement of the roots of the harvested tree stump during operation. Accordingly, the use of the hand-held motorized auger requires considerable muscular effort and is very tiring to the operator. Furthermore, proper orientation of the drilled hole is difficult to maintain because of the difficult operative nature of the motorized auger.

With the hand-held motorized augers, the tree replacement process is labor intensive and requires substantial effort getting up and down to chop roots, pick-up the hand-held motorized auger, drill the hole, lower the hand-held motorized auger, get down on your knees to plant the replacement seedling, pack dirt around the seedling, and then pick-up all the equipment to move on to the next site. Some motorized auger devices tend to scatter dirt away from the hole being drilled by the auger, resulting in a more difficult effort to pack soil around the replacement seedling to finish the re-planting process.

It would, therefore, be desirable to provide an apparatus to improve the operation of drilling a hole for the replacement of harvested trees, particularly in tree farm operations in which the trees are arranged in a grid pattern and the replacement seedlings are to be planted between more mature, unharvested trees.

Also, it would be desirable to provide an auger mechanism that would improve the operation of a motorized auger to cut through tree roots and minimize the displacement of dirt away from the drilled hole.

SUMMARY OF THE INVENTION

It is an object of this invention to overcome the aforementioned disadvantages of the prior art by providing a hole drilling apparatus that can be easily and conveniently operated within the confines of a Christmas tree farm to drill holes for the planting of trees in a predetermined grid pattern.

It is another object of this invention to provide a hole drilling apparatus that can be maneuvered within the grid of a conventional Christmas tree farm to drill a hole for the planting of a replacement tree seedling.

It is an advantage of this invention that the size of the hole drilling apparatus permits movement within an existing tree planting grid without damaging the existing trees growing within the grid pattern.

It is a feature of this invention that the hole drilling apparatus is powered to facilitate the drilling of holes in difficult digging conditions, particularly adjacent an existing tree stump.

It is another feature of this invention that the hole drilling apparatus includes a work plate that is pivotally supported by the frame of the apparatus to facilitate the advancement of the auger mechanism into the ground.

It is still another feature of this invention that the frame of the hole drilling apparatus includes a bifurcated frame, including a base frame portion pivotally carrying a working frame portion.

It is still another feature of this invention that the working frame member is biased by a spring mechanism toward a raised pivoted position.

It is another advantage of this invention that the spring force exerted by the spring mechanism is sufficient to keep an auger mechanism mounted on a work plate supported on the working frame member in a raised pivoted position.

It is yet another object of this invention to provide a means by which the hole drilling apparatus can be converted into a compact transport configuration to allow the apparatus to be transported from one location to another conveniently.

It is yet another feature of this invention that the spring mechanism can be disengaged to permit the working frame member to be lowered against the base frame member.

It is still another advantage of this invention that the compact transport configuration has a lower profile, allowing the hole drilling apparatus to be stored and/or transported in a smaller envelope.

It is still another feature of this invention that the spring mechanism can be utilized when the hole drilling apparatus is in the compact transport configuration to retain the apparatus in the compact transport configuration.

It is a further feature of this invention that the spring mechanism can engage one of the tires of the hole drilling apparatus to restrict rotation thereof while the hole drilling apparatus is in the compact transport configuration.

It is yet another advantage of this invention that the restricted tire rotation effected by the re-positioned spring mechanism prevents the transported hole drilling apparatus from moving.

It is still another feature of this invention that the spring mechanism comprises a pair of torsion springs mounted on the pivot assembly connecting the working frame member to the base frame member.

It is yet another feature of this invention that each of the torsion springs is configured to have a long restraining end received by a hook member carried by the base frame member and a shorter biasing end received by an anchor member carried by the working frame member.

It is yet another advantage of this invention that the long restraining end of each torsion spring can be manually manipulated to effect a disengagement of the spring mechanism by releasing the spring force to permit the biasing ends to be released from the anchor.

It is still another advantage of this invention that the biasing ends of the torsion springs can be re-positioned to engage the front tire rotatably supported on the base frame member to limit movement of the apparatus when the apparatus is placed into the compact transport configuration.

It is a further object of this invention to overcome certain disadvantages of the prior art by providing an improved auger mechanism.

It is a further advantage of this invention that the cutting operation of the auger mechanism is enhanced by providing an improved serrated cutting bit at the cutting edge of the spiral flighting.

It is a further feature of this invention to provide a cutting bit on the lower cutting edge of the auger mechanism flighting that is angled in a non-perpendicular manner relative to the longitudinal axis of the auger shaft.

It is still a further feature of this invention that the angled cutting bit slopes downwardly away from the auger shaft such that the end of the cutting bit further away from the auger shaft engages the ground before the end of the cutting bit adjacent the shaft.

It is still a further advantage of this invention that the angled cutting bit is detachably mounted on the cutting edge of the spiral flighting to permit replacement of worn cutting bits.

It is yet a further object of this invention to provide a hole drilling apparatus for drilling holes for the planting of replacement Christmas trees which is durable in construction, inexpensive of manufacture, carefree of maintenance, facile in assemblage, and simple and effective in use.

These and other objects, features and advantages are accomplished according to the instant invention by providing a hole drilling apparatus that will facilitate the task of drilling holes in the ground at predetermined locations for the planting of replacement Christmas tree seedlings. The hole drilling apparatus includes a bifurcated frame having a base frame portion and a working frame portion pivotally mounted on the base frame portion. A spring mechanism operatively engages the working frame portion and the base frame portion to bias the working frame portion into a raised pivoted position. The working frame portion pivotally carries a work plate having an auger mechanism mounted thereon for pivotal movement in a vertical manner with the working frame portion to advance the auger mechanism into the ground during operation to drill a hole. The work plate includes a stop member engageable with the working frame portion to limit the pivotal movement of the work plate, particularly when the auger member is removed from the power source to place the apparatus in a compact transport configuration, resulting in an imbalance on the work plate.

The spring mechanism can be re-positioned to release the biasing force exerted thereby and allow the apparatus to be converted into the compact transport position with the working frame portion lowered against the base frame portion to reduce the profile of the apparatus. The spring mechanism can then be used to brake the front tire of the apparatus to prevent the apparatus from rolling around during transport thereof. The performance of the auger mechanism is also improved with the addition of an angled cutting bit detachably mounted on the cutting edge of the auger flighting. The cutting bit is angled downwardly away from the shaft of the auger so that the outside edge of the bit will engage the ground before the edge of the bit next to the auger shaft.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Referring now to FIGS. 1–4, a hole drilling apparatus 10 incorporating the principles of the instant invention can best be seen. Any left and right references are used as a matter of convenience and are determined by standing at the handles of the apparatus at the rear thereof and facing the motorized auger and the forward end of the apparatus. The hole drilling apparatus 10 comprises a mobile apparatus supported above the ground by a pair of rear wheels 17 and a single forward wheel 19.

The hole drilling apparatus 10 has a pivoted frame structure including a base frame 11 and a movable working frame member 20 pivotally connected to the base frame 11 about a generally laterally disposed, horizontal pivot axis 15 such that the movable working frame member 20 is movable in a generally vertical direction. The base frame 11 includes a pair of rearwardly extending and spaced wheel arms 16, laterally spaced by a cross frame member 12, for rotatably mounting a corresponding pair of rear wheels 17. The single front wheel 19 is rotatably mounted between a pair of front wheel struts 18 extending forwardly from the cross frame member 12 of the base frame 11. Forwardly positioned journal members 14 are formed as part of the base frame 11 and are spaced forwardly of the cross frame member 12 by transversely spaced side frame members 13. The journal members 14 define the pivot axis 15.

Figure 1:
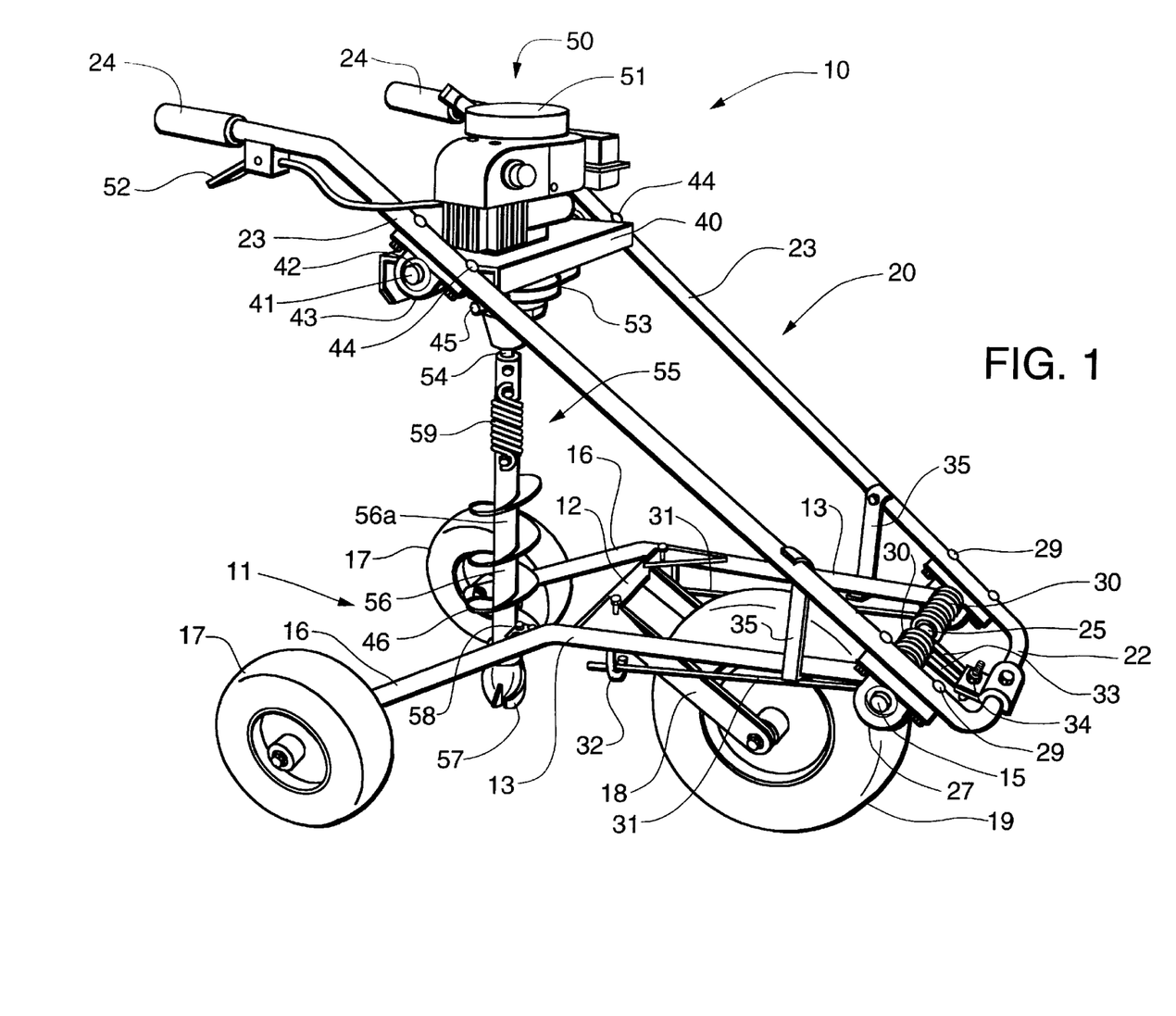
FIG. 1 is an upper right side perspective view of a hole drilling apparatus incorporating the principles of the instant invention, the hole drilling apparatus being oriented in a raised operative position to begin the drilling of a hole in the ground.
Figure 2:
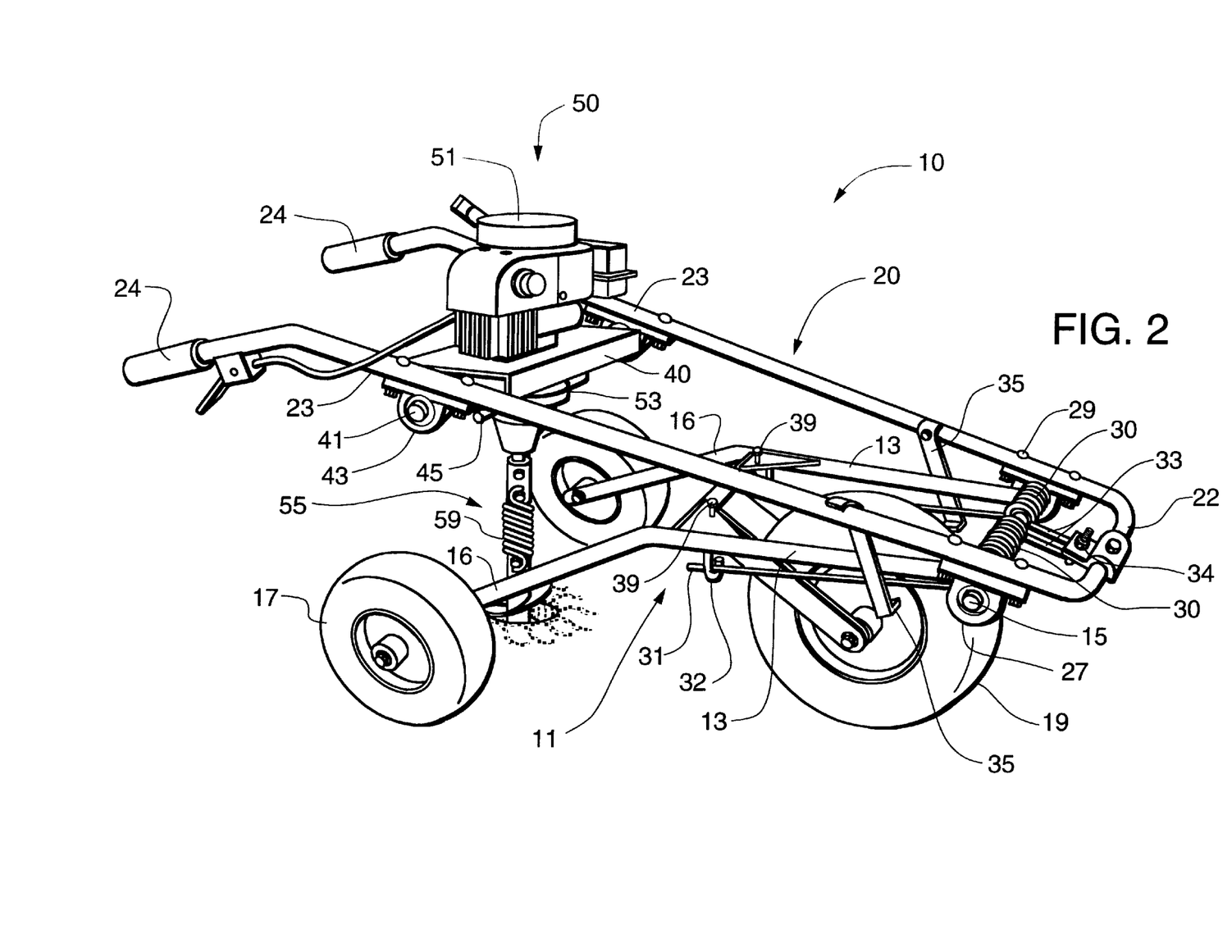
FIG. 2 is an upper right side perspective view of the hole drilling apparatus similar to that of FIG. 1, except that the hole drilling apparatus is oriented in a lowered position having drilled a hole into the ground, the auger being engaged into the ground.
Figure 3:
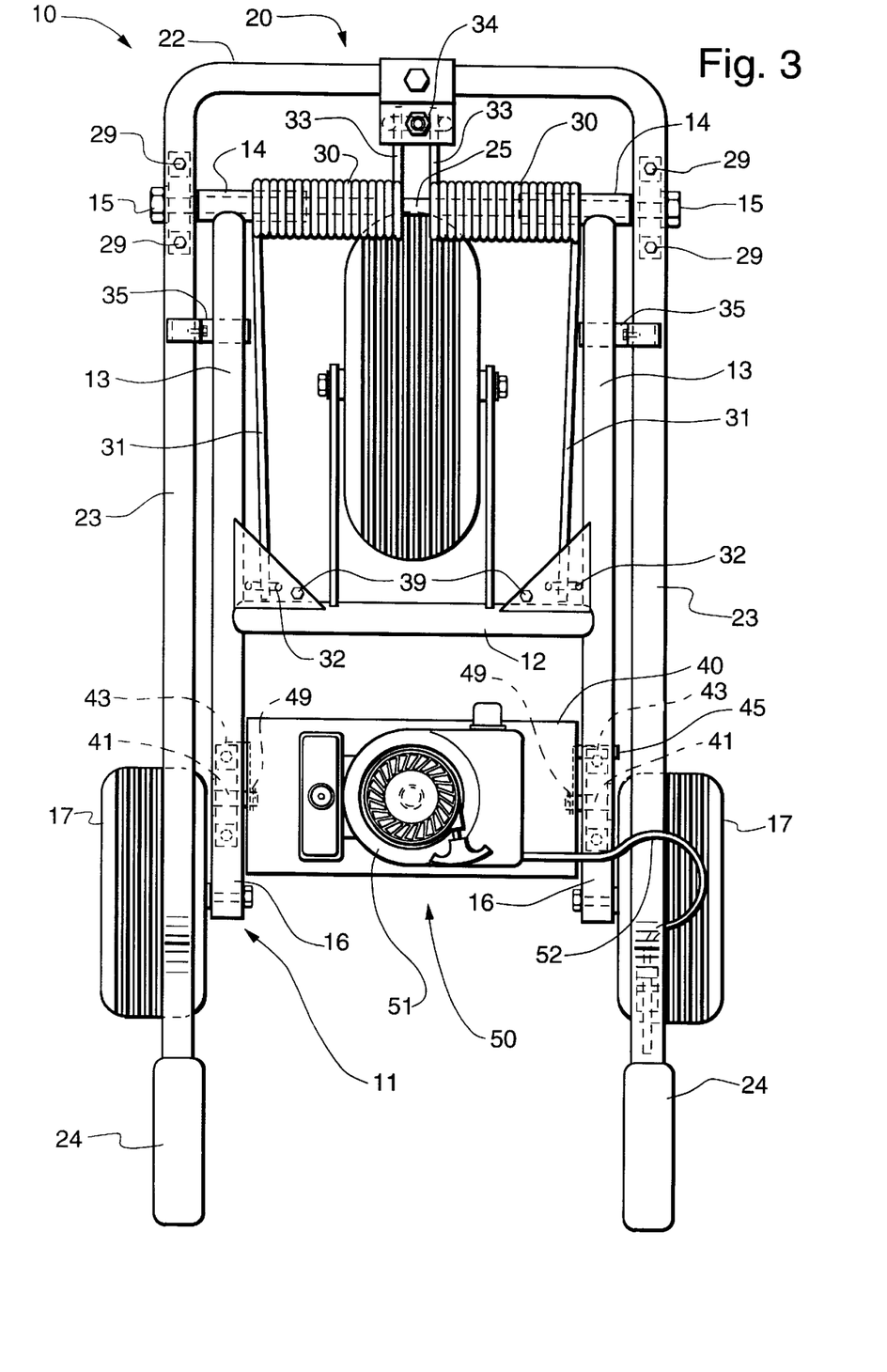
FIG. 3 is a top plan view of the hole drilling apparatus of FIGS. 1 and 2.

The movable frame member 20 is preferably formed in a manner to facilitate assembly and disassembly, as shown in FIG. 1, with a U-shaped front support member 22 and a pair of rearwardly extending handle members 23 connectable to the support member 22 by bolts and terminating in rearwardly positioned grip portions 24 for grasping by the operator. By properly balancing the respective lengths of the support member 22 and the handle members 23, the apparatus 10 can be packaged effectively for shipment, the handle members 23 being the longest components of the apparatus 10. A pivot bar 25 is supported within the hollow journal members 14 and fixed relative thereto, preferably by bolts (not shown) to define the pivot axis 15, as best seen in FIGS. 2 and 3. The lateral ends of the pivot bar 25 extending through the journal members 14 are engaged with pivot bearings 28 mounted in respective castings 27 that are affixed to the movable working frame member 20 by bolts 29. Preferably, the castings 27 are milled or grooved into the surface of the casting adjacent the handle 23 to mate better with the handle member 23 to which the casting 27 is to be affixed.

Once assembled, one skilled in the art will recognize that the movable working frame 20 is pivotally movable relative to the base frame 11 about the pivot axis 15, due to the mounting of the pivot bar 25 within the pivot bearings 28 supported within the castings 27. To bias the movable working frame 20 upwardly, a pair of torsion springs 30 are mounted on the journal members 14, each with a long restraining end 31 supported in a restraining device, shown in the form of a hook member 32 depending from the cross frame member 12 of the base frame 11 and a biasing end 33 engaged with an anchor member 34 affixed to and depending downwardly from the bight of the U-shaped support member 22. One skilled in the art will recognize that the restraining device could be provided in alternative forms or configurations other than the hook members 32. For example, the restraining device could be formed as an integral part of the gusset reinforcing the joint between the cross frame member 12 and the side frame members 13, such as a corner (not shown) of the gusset bent down to permit engagement with the restraining ends 31. Furthermore, one skilled in the art will readily recognize that the anchor 34 could be integrally formed with the U-shaped member 22 or permanently affixed thereto, such as by welding, as well as be detachably mounted as shown in the drawings. To limit the upward movement of the working frame 20, a stop member 35, preferably in the form of a J-shaped strap, is connected to each of the handle members 23 and positioned for engagement with the longitudinally extending side frame members 13 of the base frame 11.

The handle members 23 pivotally support a work plate 40 transversely disposed between the handle members 23 forwardly of the grip portions 24. Similarly to the mounting of the pivot bar 25 in the pivot bearings 28, the work plate 40 includes a mounting shaft 41 that is pivotally received in pivot bearings 42 mounted in castings 43 detachably affixed to the respective handle members 23 by bolts 44. Like the castings 27, the castings 43 are milled or grooved to mate with the handles 23. The work plate 40 is adapted to mount the motor 51 of a motorized auger mechanism 50 in such a manner that the majority of the weight is located rearwardly of the pivot bearings 42. The weight of the auger assembly 55 depending downwardly from the motor 51 keeps the work plate 40 in a generally vertical orientation whenever the apparatus 10 is placed into a start position with the working frame 20 in its upwardmost position where the J-shaped strap stops 35 are engaged with the side frame members 13, thereby allowing the auger assembly 55 to be properly oriented at the beginning of the hole drilling operation.

Figure 5:
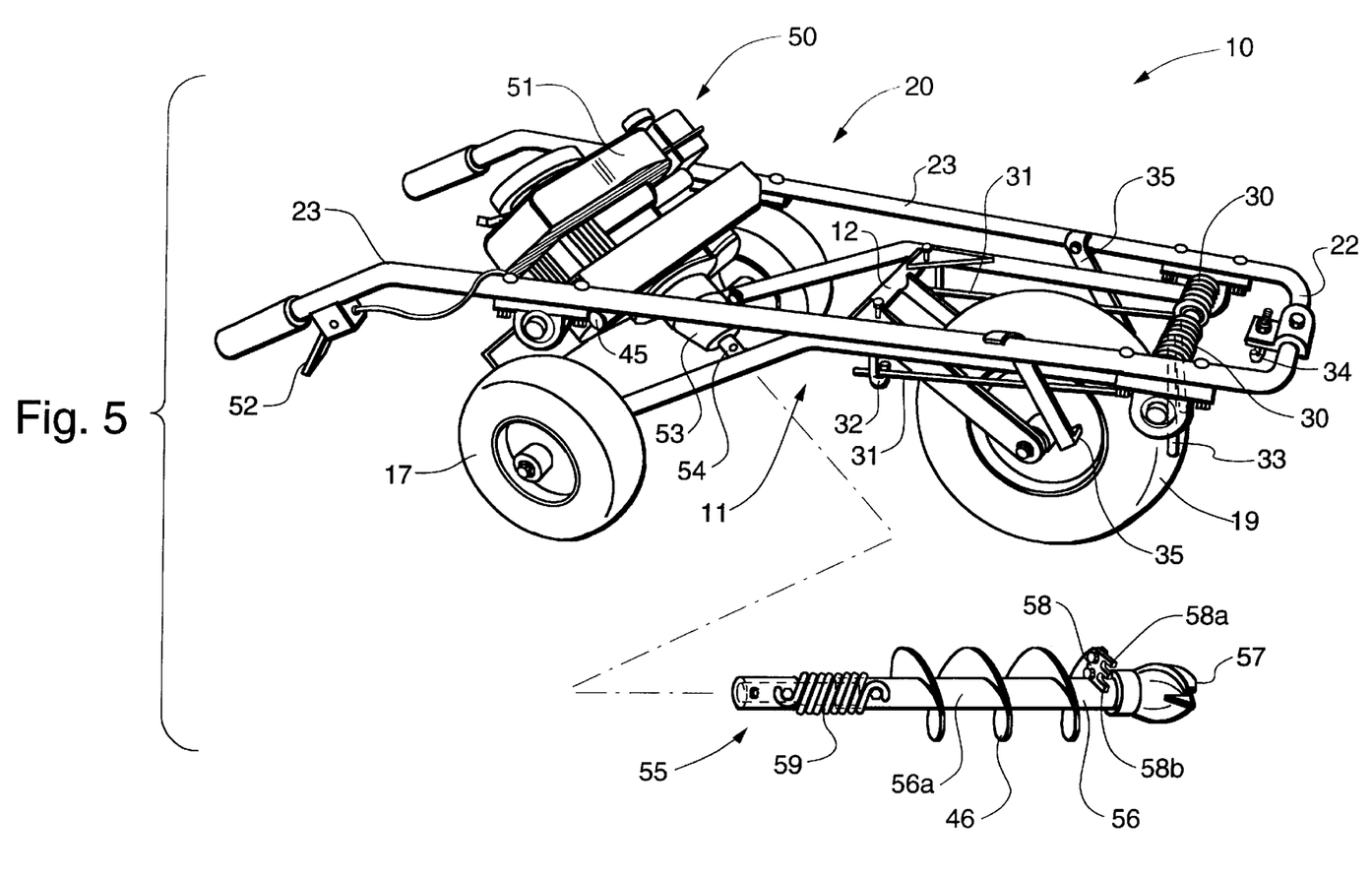
FIG. 5 is an upper right side perspective view of the hole drilling apparatus shown in FIGS. 1–4, but oriented in a transport position with the frame collapsed and the auger removed to facilitate transport thereof.

A stop member 45 extending outwardly from the work plate 40 to be engageable with the handle members 23 is provided to limit the movement of the work plate 40 beyond a preselected orientation with respect to the handle members 23 so that the work plate 40 is free to pivot relative to the handle members 23 during the drilling operation, as described in greater detail below, but is not permitted to turn the motor 51 upside down when the auger assembly 55 is removed for placing the apparatus 10 into a compact transport position, as shown in FIG. 5. Conventional controls 52 for operating the motor 51 can be mounted on one of the grip portions 24 for convenient access thereto by the operator. Typically, the motor 51 uses a centrifugal clutch that enables the release of the throttle control 52 to stop the operation of the auger assembly 55, but not the motor 51.

The work plate 40 is also provided with a pair of torsion springs 49 operably interconnecting the work plate 40 with the opposing handle members 23 to urge the work plate 40 in a rotational manner such that the work plate stop 45 engages the corresponding handle member 23. Since the motorized auger mechanism 50, including the motor 51 once the auger assembly 55 is detached therefrom, is centered on the work plate 40, the work plate springs 49 keep the work plate stop 45 against the handle 23 and prevents the motor 51 from turning upside down when the auger assembly 55 is disengaged. When the auger member 56 is engaged into the ground drilling a hole, the biasing force of the work plate springs 49 can be overcome as the working frame 20 is lowered relative to the base frame 11, thereby separating the work plate stop 45 from its corresponding handle member 23.

The an auger assembly 55 preferably includes a auger member 56 that is detachably connected to the output shaft 54 of the gearbox 53 operably driven by the motor 51 to facilitate the transformation of the apparatus 10 into a compact transport position, as seen in FIG. 5. The auger member 56 is formed of a longitudinal shaft 56a around which an auger flighting 46 is spirally affixed. A conventional torsion spring 59 interconnecting the auger member 56 and the output shaft 54 permits some rotational movement of the auger member 56 relative to the output shaft 54 in the event a root or stone is engaged by the auger member 56 and a limited amount of deflection is required. The distal end of the auger member 56 is provided with a first serrated bit 57, which can be formed in a number of conventional configurations, to facilitate the drilling of the hole. Furthermore, the terminal cutting edge at the end of the auger flighting 46 is provided with a detachable second serrated bit 58 also to facilitate the digging of the hole.

Figure 4:
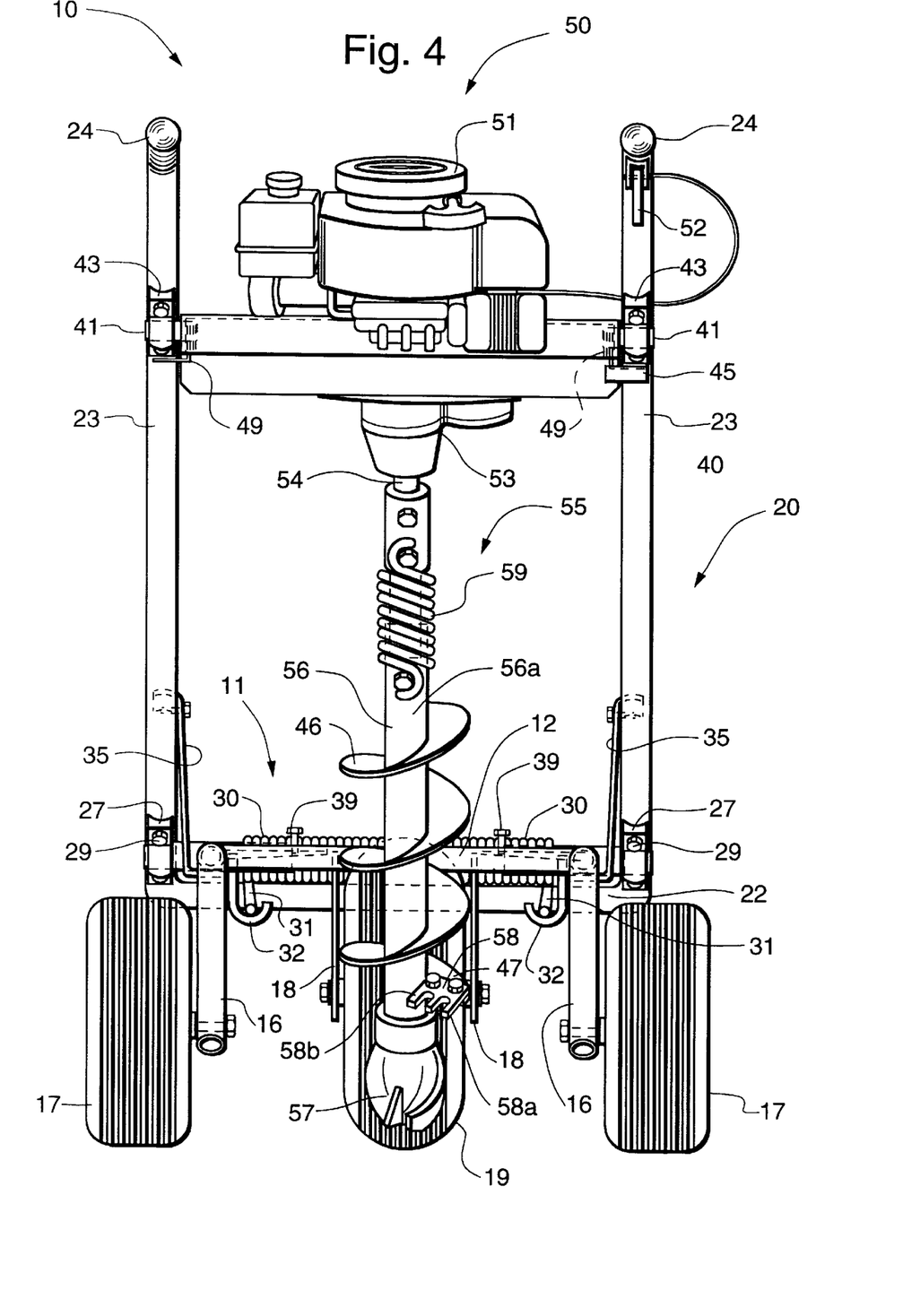
FIG. 4 is a rear elevational view of the hole drilling apparatus shown in FIG. 3, the hole drilling apparatus being oriented in the raised operative position.

It has been found, as best seen in FIG. 4, that the second serrated bit 58 is preferably angled with respect to the longitudinal axis of the auger shaft 56a in such a manner that the distal end 58a of the second serrated cutting bit 58 (spaced outwardly from the auger shaft 56a) is oriented lower toward the first serrated bit 57 than the end 58b of the second serrated bit 58 positioned adjacent to the shaft 56a of the auger member 56. The lowermost extremity (cutting edge) 47 of the auger fighting 46 is typically a generally planar plate having the second cutting bit 58 positioned at one end and having the opposing end lead into the spiraled auger flighting 46. The extremity of this lowermost portion 47 of the auger flighting 46 adjacent the second bit 58 is also angled to correspond to the tilted second serrated cutting bit 58; however, the remaining portion of the auger fighting 46 is conventional in that it spirals around the shaft 56a of the auger member 56 in an orthogonal orientation relative thereto. The downwardly tilted second bit 58 and adjacent flighting portion 47 has been found to greatly improve the performance of the auger member 56 in cutting through roots in drilling the hole.

In operation, the apparatus 10 is placed over the location at which a new seedling planting hole is desired, with the auger assembly 55 oriented vertically and the first serrated bit 57 engaged with the ground. The motor 52 is the operated in a conventional manner to effect rotation of the auger assembly 55 whereupon the auger assembly advances into the ground, displacing dirt upwardly around the auger. The operator can push downwardly on the grip portions 24 to assist the advancement of the auger assembly 55 into the ground. As the auger assembly 55 advances into the ground, the working frame 20 pivots about the pivot axis 15 carried by the base frame 11, allowing the handle members 23 to move downwardly closer to the ground.

Eventually, the auger assembly 55 will be advanced sufficiently into the ground that the drilling of the hole is completed, as is represented in FIG. 2. The work plate 40 pivots about its mounting shaft 41 pivotally supported in the bearings 42 to allow the motorized auger mechanism 50 to remain in a vertical orientation. To compensate for the location of the pivot axis 15 being spaced forwardly of the pivoting mounting shaft 41 of the work plate 40, the apparatus 10 is capable of advancing slightly over the ground by the wheels 17, 19, thereby allowing the auger assembly 55 to remain in its vertical orientation.

The reversing of the gearbox 53 allows the auger assembly 55 to back out of the drilled hole. The torsion springs 30, which had been tensed by the lowering of the working frame 20 toward the ground, bias the working frame 20 upwardly and facilitate the raising of the working frame 20. As a result, the operator does not have to lift the full weight of the motorized auger mechanism 50 and working frame 20, thereby reducing the muscular effort required to drill holes for planting seedlings.

Following the drilling of one transplant hole, the operator can push the apparatus 10 to the next location where a planting hole is desired and repeat the above-described process to drill another hole, without requiring the motorized auger mechanism 50 to be physically lifted and carried from one location to another. The size of the apparatus 10 is much smaller than the five foot grid spacing of the trees, allowing the apparatus 10 to be maneuvered easily between locations at which holes are desired without causing damage to any of the yet unharvested trees. The spaced rear wheels 17 allow the apparatus 10 to be centered directly over a harvested tree stump to position the auger assembly 55 precisely at the desired location, thereby maintaining the grid pattern for the trees.

The apparatus 10 can be easily transformed from the operating configuration shown in FIGS. 1–4 to the compact transport or storage configuration shown in FIG. 5. First the auger member 56 is removed from the output shaft 54 of the gearbox 53 and the work plate 40 is permitted to pivotally move until the stop member 45 on the work plate 40 is engaged with the corresponding handle member 23, this movement of the work plate 40 being urged by the work plate springs 49. From the fully upright position of the working frame 20, as seen in FIGS. 1 and 3, in which orientation the torsion springs 30 are under minimal tension, the restraining end 31 of each torsion spring 30 is then disengaged from the corresponding hook member 32 to allow the working frame to be lowered downwardly against the base frame 11.

The biasing ends 33 of the torsion springs 30 then can be disengaged from the anchor 34 by a slight lateral movement of each respective spring 30 on the corresponding journal member 14. The restraining ends can then be re-engaged with the corresponding hook members 32, or elevated above the corresponding hook member 32 and engaged with a spring stop 39 formed on the base frame 11, depending on the specific configuration of the torsion springs 30. Each spring stop 39 is preferably in the form of a small bolt screwed into a gusset at the joints between the cross frame member 12 and the side frame members 13, although other equivalent configurations can also be provided, such as a bent tab portion (not shown). The torsion springs 30 are preferably configured that the re-engagement of the restraining ends with the hook members 32 or against the spring stops 39 naturally place the corresponding biasing ends 33 against the front tire 19 when the apparatus 10 is placed in the compact transport position shown in FIG. 5. This interference with the rotation of the front tire 19 limits the movement of the apparatus 10 when in the transport configuration so that the apparatus 10 will not roll around when being transported in the back of a truck or in a wagon or the like. An alternative configuration of the torsion springs 30 could result in a placement of the biasing ends 33 of the torsion springs 30 beneath the anchor 34 to restrict movement of the working frame 20 out of its transport/storage position adjacent the base frame 11.

Returning the apparatus 10 to an operating configuration involves a reversal of the above-described process for transforming the apparatus 10 into the transport or storage position. The restraining ends 31 of the torsion springs 30 are disengaged from the hook members 32 or spring stops 39 to allow the biasing ends 33 to be re-engaged with the anchor 34, which may first require a lifting of the working frame 20. A re-connecting of the auger member 56 with the output shaft 54 of the gearbox 53, thereby pivoting the work plate 40 back into its generally horizontal orientation places the apparatus 10 in condition to begin operation drilling holes in the ground.

The arrangement of parts and configuration of the apparatus 10 described above is particularly advantageous with respect to the weight distribution of the apparatus. The location of the motorized auger mechanism 50 relative to the front wheel 19 and the distribution of weight forwardly of the front wheel 19 to serve as a counterbalance, the U-shaped support member 22 being built of solid stock instead of hollow tubing, assist in making the apparatus 10 very easy to control and operate. The weight of the motorized auger mechanism 50 in the prototype constructed according to the description set forth herein is approximately 43 pounds; however, the force required to lift the apparatus 10 about the front wheel 19, like a wheelbarrow, was only 23 pounds. This configuration and weight distribution makes the apparatus very easy to use.

One skilled in the art will readily recognize a hole drilling apparatus 10 that is particularly adapted for use in the replacement of harvested trees in a "choose-and-cut" Christmas tree farm operation. The apparatus 10 can be easily stored or transported from field to field in a compact configuration. The apparatus is easily maneuvered around unharvested trees without risk of damage thereto. The apparatus 10 is easy to maintain, easy to construct and simple and effective to use.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A portable hole drilling apparatus for drilling holes in the ground for the planting of trees comprising:
   a wheeled frame including a base frame member having wheels mounted thereon for mobile support of the frame over the ground and a working frame member pivotally supported on said base frame member by a pivot to be movable between a raised pivoted position and a lowered pivoted position;
   a spring mechanism interengaging said base frame member and said working frame member to bias said working frame member into said raised pivoted position, said spring mechanism including a biasing end engageable with an anchor member mounted on said working frame member and a restraining end engageable with a hook member mounted on said base frame member; and
   said working frame member supporting a work plate pivotally mounted thereon, said work plate having an auger mechanism mounted thereon, including a power source to provide operative power for said auger mechanism.

2. The hole drilling apparatus of claim 1 wherein said restraining end can be disengaged from said hook member to permit a disengagement of said biasing end from said anchor to relieve all biasing force on said working frame member, thereby allowing said working frame member to be collapsed against said base frame member for a compact transport configuration.

3. The hole drilling apparatus of claim 2 wherein said biasing end can be biased against a front wheel mounted on said base frame member, with said restraining end being engaged against a stop on said base frame member, when said hole drilling apparatus is in said compact transport configuration to restrict rotation of said front wheel and, thereby, limit mobility of said hole drilling apparatus while in said compact transport configuration.

4. The hole drilling apparatus of claim 2 wherein said work plate includes a stop member engageable with said working frame member to limit the pivotal movement of said work plate relative to said working frame member when placed into said compact transport configuration.

5. The hole drilling apparatus of claim 4 wherein said work plate is pivotally mounted to provide a range of movement of said auger mechanism when said apparatus is in an operative configuration, thereby allowing said working frame member to move between said raised pivoted position and said lowered pivoted position as said auger mechanism is lowered into the ground to drill a hole in the ground.

6. The hole drilling apparatus of claim 5 wherein said auger mechanism includes an auger member operably connectable to said power source mounted on said work plate, said auger member being disconnectable from said power source when said apparatus is placed into said compact transport configuration, said stop member preventing said work plate from inverting said power source.

7. The hole drilling apparatus of claim 2 wherein said working frame member includes a pair of laterally spaced handle members located proximate to said work plate.

8. The hole drilling apparatus of claim 2 wherein said working frame member includes a pair of straps positioned for engagement with said base frame member to limit the upward pivotal movement of said working frame member relative to said base frame member as biased by said spring mechanism, thereby defining said raised pivoted position.

9. The hole drilling apparatus of claim 2 wherein said working frame member is formed with first and second handle members detachably connected to a U-shaped bight member on which is mounted said pivot, said U-shaped bight member being formed of solid bar stock to offset a portion of the weight of said work plate.

10. A mobile hole drilling apparatus comprising:
    a base frame member having mounted thereon at least three wheels for mobile movement of said apparatus over the ground;
    a working frame member pivotally connected to said base frame member by a first generally horizontally disposed pivot mechanism for permitting said working frame member to move in a generally vertical direction between a raised position and a lowered position, said working frame member terminating in a handle;
    a work plate pivotally mounted on said working frame member by a second generally horizontally disposed pivot mechanism for permitting said work plate to rotate relative to said working frame member; said work plate being located proximate to said handle;
    an auger mechanism carried by said work plate and being engageable with the ground to drill a hole therein as said working frame member is moved from said raised position toward said lowered position, said auger mechanism having a power source mounted on said work plate and a detachable auger member connected to said power source; and
    a spring mechanism operably associated with said first pivot mechanism to bias said working frame member toward said raised position, said spring mechanism being selectively disengageable to eliminate any biasing force on said working frame member and allow said apparatus to be placed into a compact transport position.

11. The hole drilling apparatus of claim 10 wherein said spring mechanism includes a torsion spring coaxially mounted on said first pivot mechanism; said torsion spring including a biasing end engageable with an anchor member mounted on said working frame member and a restraining end engageable with a hook member mounted on said base frame member, the disengagement of said spring mechanism involving a disengagement of said biasing end from said anchor.

12. The hole drilling apparatus of claim 11 wherein said biasing end can be engaged with a front wheel mounted on said base frame member when said hole drilling apparatus is in said compact transport configuration to restrict rotation of said front wheel and, thereby, limit mobility of said hole drilling apparatus while in said compact transport configuration.

13. The hole drilling apparatus of claim 12 wherein said work plate is pivotally mounted to provide a range of movement of said auger mechanism when said apparatus is in an operative configuration, thereby allowing said working frame member to move between said raised pivoted position and said lowered pivoted position as said auger mechanism is lowered into the ground to drill a hole in the ground, said work plate including a stop member engageable with said working frame member to limit the pivotal movement of said work plate relative to said working frame member when placed into said compact transport configuration.

14. The hole drilling apparatus of claim 13 herein said auger mechanism includes an auger member operably connectable to said power source mounted on said work plate, said auger member being disconnectable from said power source when said apparatus is placed into said compact transport configuration, said stop member preventing said work plate from inverting said power source.

15. A portable hole drilling apparatus for drilling holes in the ground for the planting of trees comprising:

a base frame member having mounted thereon at least three wheels for mobile movement of said apparatus over the ground, including a pair of laterally spaced rear wheels and at least one front wheel;

a working frame member pivotally connected to said base frame member by a first generally horizontally disposed pivot mechanism for permitting said working frame member to move in a generally vertical direction between a raised position and a lowered position;

an auger mechanism carried by said working frame member proximate to said rear wheels and being engageable with the ground to drill a hole therein as said working frame member is moved from said raised position toward said lowered position, said auger mechanism having a power source associated therewith and a detachable auger member connected to said power source; and     a spring mechanism operably associated with said first pivot mechanism to bias said working frame member toward said raised position.

16. The hole drilling apparatus of claim 15 wherein said auger mechanism is mounted on said working frame member to be engageable with the ground forwardly of said rear wheels and rearwardly of said at least one front wheel.

17. The hole drilling apparatus of claim 16 wherein said spring mechanism is selectively disengageable to eliminate any biasing force on said working frame member and allow said apparatus to be placed into a compact transport position.

18. The hole drilling apparatus of claim 17 further comprising:

a work plate pivotally mounted on said working frame member by a second generally horizontally disposed pivot mechanism for permitting said work plate to rotate relative to said working frame member; said work plate carrying said auger mechanism.

19. The hole drilling apparatus of claim 18 wherein said work plate is pivotally mounted to provide a range of movement of said auger mechanism when said apparatus is in an operative configuration, thereby allowing said working frame member to move between said raised position and said lowered position as said auger mechanism is lowered into the ground to drill a hole in the ground, said work plate including a stop member engageable with said working frame member to limit the pivotal movement of said work plate relative to said working frame member when placed into said compact transport configuration.

20. The hole drilling apparatus of claim 15 wherein said spring member provides an adequate biasing force to support said auger mechanism in said raised position to permit a manual movement of said auger mechanism into the ground against the biasing force exerted by said spring mechanism.

21. The hole drilling apparatus of claim 20 wherein said spring mechanism includes a torsion spring coaxially mounted on said first pivot mechanism; said torsion spring including a biasing end engageable with said working frame member and a restraining end engageable with said base frame member, said spring mechanism being selectively disengageable from said working frame member and said base frame member to eliminate any biasing force on said working frame member and allow said apparatus to be placed into a compact transport position.

\* \* \* \* \*